United States Patent
Lee et al.

(10) Patent No.: US 8,708,401 B2
(45) Date of Patent: Apr. 29, 2014

(54) CRASH BRACE FOR ENERGY MANAGEMENT

(75) Inventors: Chunhui Kevin Lee, Troy, MI (US); Peyman Aghssa, Ann Arbor, MI (US); Matthew Brian Makowski, Northville, MI (US); Stephen Wai-Fun Siu, Bloomfield, MI (US); Edward Michael Wilson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/427,443

(22) Filed: Mar. 22, 2012

(65) Prior Publication Data

US 2013/0249243 A1    Sep. 26, 2013

(51) Int. Cl.
*B60G 7/02* (2006.01)
*B60J 7/00* (2006.01)
*B62D 21/11* (2006.01)

(52) U.S. Cl.
USPC ........... 296/187.03; 296/203.04; 280/124.109

(58) Field of Classification Search
USPC ............ 296/187.03, 187.11, 187.08, 187.04, 296/197.09, 203.02; 293/120–121, 109, 293/155; 188/371, 377
See application file for complete search history.

(56) References Cited

U.S. PATENT DOCUMENTS

| | | | |
|---|---|---|---|
| 3,860,258 A * | 1/1975 | Feustel et al. | 180/312 |
| 5,431,445 A * | 7/1995 | Wheatley | 280/784 |
| 5,681,057 A | 10/1997 | Whirley et al. | |
| 6,722,696 B2 * | 4/2004 | Sonomura et al. | 280/784 |
| 6,893,065 B2 * | 5/2005 | Seksaria et al. | 293/133 |
| 7,032,961 B2 * | 4/2006 | Matsuda | 296/204 |
| 7,097,235 B2 * | 8/2006 | Yasukouchi et al. | 296/187.03 |
| 7,699,346 B2 | 4/2010 | Wehner et al. | |
| 2006/0197300 A1 * | 9/2006 | Nakashima et al. | 280/124.109 |
| 2008/0160394 A1 | 7/2008 | Takasaki et al. | |
| 2009/0072586 A1 * | 3/2009 | Aghssa et al. | 296/187.11 |
| 2009/0242298 A1 | 10/2009 | Guss et al. | |

OTHER PUBLICATIONS

Honda, "Leadership in Collision," retrieved May 9, 2012 from http://corporate.honda.com/safety/details.aspx?id=collision.

* cited by examiner

*Primary Examiner* — Glenn Dayoan
*Assistant Examiner* — Sunsurraye Westbrook
(74) *Attorney, Agent, or Firm* — Jones Robb, PLLC; Jason Rogers

(57) ABSTRACT

A crash brace is incorporated into a body structure of an automotive vehicle as an energy absorption and management device to assist in managing the energy during rear and side impact collisions, thereby protecting internal structures within the rear end of the vehicle.

20 Claims, 7 Drawing Sheets

CRASH BRACE FOR ENERGY MANAGEMENT

TECHNICAL FIELD

The present teachings relate generally to energy absorbing devices and systems for an automotive vehicle. More specifically, the present teachings relate to an energy absorbing device for use in a rear end of an automotive vehicle, for example an electrically-powered vehicle.

BACKGROUND

Energy absorption and management during rear-end impact collisions is an on-going challenge and consideration in traditional gas and diesel vehicles. In recent years, this challenge has transferred to the design and development of electrically-powered vehicles. For example, in next generation alternative propulsion vehicles, a critical goal is to maintain traditional rear-end styling (e.g., short overall rear-end overhang), while providing an equivalent level of protection for sensitive systems packaged in the rear of the vehicle, such as a battery system. Many of the battery-powered vehicles are smaller-sized, and therefore, spatial management within the vehicles is also an important consideration in their design and manufacture. Thus, a need exists for a vehicle design that accomplishes designated safety goals and provides efficient packaging of a battery system while also providing ample storage space in the smaller-sized electrically powered vehicles.

SUMMARY

In accordance with various exemplary embodiments, the present teachings provide a crash brace for use as an energy absorption and management device, the crash brace having a rear arch, a front arch, a set of longitudinal structures with a plurality of triggers, the longitudinal structures connecting the rear arch to the front arch and defining a first space between the front arch, the rear arch and the longitudinal structures, the first space having a defined cross-sectional shape and volume, a set of rear mounting brackets attached to each end of the rear arch and adapted to attach to a vehicle body structure, and a front bracket assembly attached to each end of the front arch and adapted to attach to the vehicle body structure, a portion of the vehicle body structure and the front arch partially defining a second space, the second space having a defined cross-sectional shape and volume, wherein the crash brace is configured to absorb and manage impact energy and prevent the impact from affecting the cross-sectional shape and volume of the second space.

The present teachings further provide a crash brace, further including one or more attachment braces disposed about the front arch, wherein the attachment braces are adapted to facilitate the attachment of the crash brace to the vehicle body structure.

The present teachings further provide a crash brace, wherein the second space is further defined in part by a set of body rear rails, the crash brace configured to cooperate with the body rear rails.

The present teachings further provide a crash brace, wherein the rear arch is made of high strength steel.

The present teachings further provide a crash brace, wherein the front arch is made of high strength steel.

The present teachings further provide a crash brace, wherein the set of longitudinal structures is made of high strength steel.

The present teachings further provide a crash brace, wherein a cross section of the rear arch is square-shaped.

The present teachings further provide a crash brace, wherein a cross section of the rear arch is rectangular-shaped.

The present teachings further provide a crash brace, wherein a cross section of the front arch is square-shaped.

The present teachings further provide a crash brace, wherein a cross section of the front arch is rectangular-shaped.

The present teachings further provide a crash brace, wherein a cross section of the longitudinal structures is square-shaped.

The present teachings further provide a crash brace, wherein a cross section of the longitudinal structures is rectangular-shaped.

The present teachings further provide a crash brace, wherein the rear arch is configured to deform and bend upon load impact during a collision.

The present teachings further provide a crash brace, wherein the set of longitudinal structures is configured to collapse axially and in parallel with the body rear rails upon impact load transferring impact energy from the rear arch during a collision.

The present teachings further provide a crash brace, wherein the front arch is configured to dissipate impact energy to the body rear rails upon impact transferring impact energy from the longitudinal structures, and wherein the front arch protects the battery so there is zero impact with the battery during a collision.

In accordance with various exemplary embodiments, the present teachings provide a crash brace for use as an energy absorption and management device, the crash brace including a rear arch, a front arch, a set of longitudinal structures with a plurality of triggers, the longitudinal structures connecting the rear arch to the front arch and defining a first space between the front arch, the rear arch and the longitudinal structures, the first space having a defined cross-sectional shape and volume, a set of tubular brackets attached to the rear arch at first ends, a set of rear mounting brackets attached to the tubular brackets at second ends of the tubular brackets, which are opposite the first ends of the tubular brackets, the rear mounting brackets being adapted to attach to a vehicle body structure, and a front bracket assembly attached to each end of the front arch and adapted to attach to the vehicle body structure, a portion of the vehicle body structure and the front arch partially defining a second space, the second space having a defined cross-sectional shape and volume, wherein the crash brace is configured to absorb and manage rear impact energy and prevent the impact from affecting the cross-sectional shape and volume of the second space.

The present teachings further provide a crash brace, further comprising one or more attachment braces disposed about the front arch, wherein the attachment braces are adapted to facilitate the attachment of the crash brace to the vehicle body structure.

The present teachings further provide a crash brace, wherein the second space is further defined in part by a set of body rear rails, the crash brace configured to cooperate with the body rear rails.

The present teachings further provide a crash brace, wherein the rear arch is made of high strength steel.

The present teachings further provide a crash brace, wherein the front arch is made of high strength steel.

The present teachings further provide a crash brace, wherein the tubular brackets are made of high strength steel.

The present teachings further provide a crash brace, wherein the set of longitudinal structures is made of high strength steel.

The present teachings further provide a crash brace, wherein a cross section of the rear arch is square-shaped.

The present teachings further provide a crash brace, wherein a cross section of the rear arch is rectangular-shaped.

The present teachings further provide a crash brace, wherein a cross section of the front arch is square-shaped.

The present teachings further provide a crash brace, wherein a cross section of the front arch is rectangular-shaped.

The present teachings further provide a crash brace, wherein a cross section of the tubular brackets is square-shaped.

The present teachings further provide a crash brace, wherein a cross section of the tubular brackets is rectangular-shaped.

The present teachings further provide a crash brace, wherein a cross section of the longitudinal structures is square-shaped.

The present teachings further provide a crash brace, wherein a cross section of the longitudinal structures is rectangular-shaped.

The present teachings further provide a crash brace, wherein the rear arch is configured to deform and bend upon impact during a collision.

The present teachings further provide a crash brace, wherein the set of longitudinal structures is configured to collapse axially and in parallel with the body rear rails upon impact transferring impact energy from the rear arch during a collision.

The present teachings further provide a crash brace, wherein the front arch is configured to dissipate impact energy to the body rear rails upon impact transferring impact energy from the longitudinal structures, and wherein the front arch protects the battery so there is zero impact with the battery during a collision.

In accordance with various exemplary embodiments, the present teachings provide a method of manufacturing a crash brace for managing rear impact energy in a vehicle, the method including attaching a rear arch to a set of longitudinal structures at a first end, attaching a rear mounting bracket to each end of the rear arch, each rear mounting bracket attaching to a body rear rail of a body structure of the vehicle, attaching a front arch to the set of longitudinal structures at a second end, attaching a bracket assembly to each end of the front arch, each bracket assembly attaching to a body rear rail of the body structure of the vehicle, the crash brace configured to cooperate with the body rear rails.

The present teachings further provide a method, further comprising attaching one or more attachment braces to the front arch, the attachment braces facilitating attachment to the body structure.

In accordance with various exemplary embodiments, the present teachings provide a method of manufacturing a crash brace for managing rear impact energy in a vehicle, the method comprising, attaching a rear arch to a set of longitudinal structures at a first end, attaching a set of tubular brackets at first ends to each end of the rear arch, attaching the set of tubular brackets at second ends to a set of rear mounting brackets, each rear mounting bracket attaching to a body rear rail of a body structure of the vehicle, attaching a front arch to the set of longitudinal structures at a second end, attaching a bracket assembly to each end of the front arch, each bracket assembly attaching to a body rear rail of the body structure of the vehicle, the crash brace configured to cooperate with the body rear rails.

The present teachings further provide a method, further comprising attaching one or more attachment braces to the front arch, the attachment braces facilitating attachment to the body structure.

In accordance with various exemplary embodiments, the present teachings provide a method of dissipating impact energy from an impact load through a crash brace during a rear collision, the method including transferring impact energy received by a bumper to a crash brace, the crash brace including a rear arch; a front arch, a set of longitudinal structures with a plurality of triggers, the longitudinal structures connecting the rear arch to the front arch and defining a first space between the front arch, the rear arch and the longitudinal structures, the first space having a defined cross-sectional shape and volume, a set of rear mounting brackets attached to each end of the rear arch and adapted to attach to a vehicle body structure, and a front bracket assembly attached to each end of the front arch and adapted to attach to the vehicle body structure, a portion of the vehicle body structure and the front arch partially defining a second space, the second space having a defined cross-sectional shape and volume, wherein the crash brace is configured to absorb and manage impact energy and prevent the impact from affecting the cross-sectional shape and volume of the second space; transferring impact energy from the rear arch of the crash brace to a set of body rear rails of the body structure, the crash brace configured to cooperate with the body rear rails, transferring impact energy from the rear arch to the longitudinal structures, transferring impact energy from the longitudinal structures to the front arch, transferring impact energy from the front arch to the body rear rails, wherein the energy transferred is dissipated from the impact load to the body rear rails preventing impact from affecting the cross-sectional shape and volume of the second space.

In accordance with various exemplary embodiments, the present teachings provide a method of dissipating impact energy from an impact load through a crash brace during a rear collision, the method including transferring impact energy received by a bumper to a crash brace, the crash brace including a rear arch, a front arch, a set of longitudinal structures with a plurality of triggers, the longitudinal structures connecting the rear arch to the front arch and defining a first space between the front arch, the rear arch and the longitudinal structures, the first space having a defined cross-sectional shape and volume, a set of tubular brackets attached to the rear arch at first ends, a set of rear mounting brackets attached to the tubular brackets at second ends of the tubular brackets, which are opposite the first ends of the tubular brackets, the rear mounting brackets being adapted to attach to a vehicle body structure, and a front bracket assembly attached to each end of the front arch and adapted to attach to the vehicle body structure, a portion of the vehicle body structure and the front arch partially defining a second space, the second space having a defined cross-sectional shape and volume, wherein the crash brace is configured to absorb and manage rear impact energy and prevent the impact from affecting the cross-sectional shape and volume of the second space; transferring impact energy from the rear arch of the crash brace to the tubular brackets, transferring impact energy from the tubular brackets to a set of body rear rails of the body structure, the crash brace configured to cooperate with the body rear rails, transferring impact energy from the rear arch to the longitudinal structures, transferring impact energy from the longitudinal structures to the front arch, transferring impact energy from the front arch to the body rear rails, wherein the energy transferred is dissipated from the impact load to the body rear rails preventing impact from affecting the cross-sectional shape and volume of the second space.

In accordance with various exemplary embodiments, the present teachings provide a method of dissipating impact energy from an impact load through a crash brace during a side collision of a vehicle, the method including transferring impact energy received by a side of the vehicle having a body rear rail to a crash brace, the crash brace including a rear arch, a front arch, a set of longitudinal structures with a plurality of triggers, the longitudinal structures connecting the rear arch to the front arch and defining a first space between the front arch, the rear arch and the longitudinal structures, the first space having a defined cross-sectional shape and volume, a set of rear mounting brackets attached to each end of the rear arch and adapted to attach to a vehicle body structure, and a front bracket assembly attached to each end of the front arch and adapted to attach to the vehicle body structure, a portion of the vehicle body structure and the front arch partially defining a second space, the second space having a defined cross-sectional shape and volume, wherein the crash brace is configured to absorb and manage impact energy and prevent the impact from affecting the cross-sectional shape and volume of the second space; transferring impact energy from the body rear rail on the side of impact to the rear arch of the crash brace, the crash brace configured to cooperate with the body rear rails, transferring impact energy from the rear arch to a body rear rail opposite the side of impact, transferring impact energy from the body rear rail on the side of impact to the front arch, transferring impact energy from the front arch to the body rear rail opposite the side of impact, wherein the energy transferred is dissipated from the impact load to the body rear rails preventing impact from affecting the cross-sectional shape and volume of the second space.

In accordance with various exemplary embodiments, the present teachings provide a method of dissipating impact energy from an impact load through a crash brace during a side collision of a vehicle, the method including transferring impact energy received by a side of the vehicle having a body rear rail to a crash brace, the crash brace including a rear arch, a front arch, a set of longitudinal structures with a plurality of triggers, the longitudinal structures connecting the rear arch to the front arch and defining a first space between the front arch, the rear arch and the longitudinal structures, the first space having a defined cross-sectional shape and volume, a set of tubular brackets attached to the rear arch at first ends, a set of rear mounting brackets attached to the tubular brackets at second ends of the tubular brackets, which are opposite the first ends of the tubular brackets, the rear mounting brackets being adapted to attach to a vehicle body structure, and a front bracket assembly attached to each end of the front arch and adapted to attach to the vehicle body structure, a portion of the vehicle body structure and the front arch partially defining a second space, the second space having a defined cross-sectional shape and volume, wherein the crash brace is configured to absorb and manage rear impact energy and prevent the impact from affecting the cross-sectional shape and volume of the second space; transferring impact energy from the body rear rail on the side of impact to the tubular bracket of the crash brace on the side of impact, the crash brace configured to cooperate with the body rear rails, transferring impact energy from the tubular bracket on the side of impact to the rear arch and to the tubular bracket opposite the side of impact, transferring impact energy from the tubular bracket opposite the side of impact to a body rear rail opposite the side of impact, transferring impact energy from the body rear rail on the side of impact to the front arch, transferring impact energy from the front arch to the body rear rail opposite the side of impact, wherein the energy transferred is dissipated from the impact load to the body rear rails preventing impact from affecting the cross-sectional shape and volume of the second space.

Additional objects and advantages of the present teachings will be set forth in part in the description which follows, and in part will be obvious from the description, or may be learned by practice of the present teachings. Various objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings.

The accompanying drawings, which are incorporated in and constitute a part of this specification, illustrate embodiments of the present teachings and together with the description, serve to explain the principles of the present teachings.

BRIEF DESCRIPTION OF THE DRAWINGS

At least some features and advantages of the present teachings will be apparent from the following detailed description of embodiments consistent therewith, which description should be considered with reference to the accompanying drawings, wherein.

Although the following detailed description makes reference to illustrative exemplary embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The illustrated exemplary embodiments are not intended to limit the disclosure. To the contrary, the disclosure is intended to cover alternatives, modifications, and equivalents.

Figure 1:
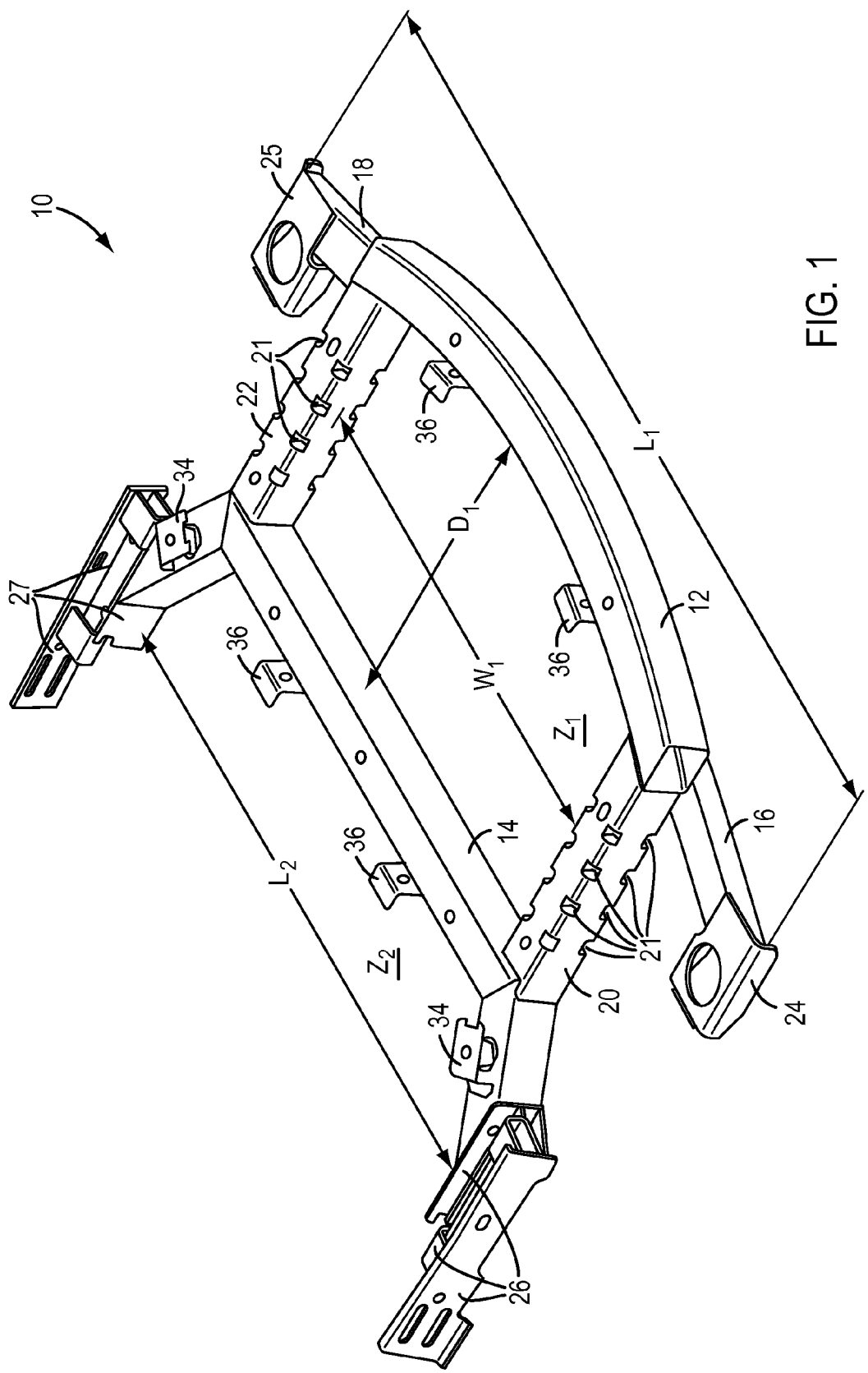
FIG. 1 is a top perspective view of an exemplary embodiment of a crash brace of an automotive vehicle including an energy absorbing device made in accordance with the present teachings.

In automotive vehicles, a body structure is typically attached to certain support structures that provide stability, strength and increased safety within the vehicle. As depicted in FIG. 1, a crash brace 10 can be integrated into the body structure as one of the aforementioned support structures and can be designed to withstand the impact of a rear or side impact collision, and to absorb and manage the energy from the impact. Additionally, the crash brace 10 can be designed to protect the surrounding structures, including stabilizing a package zone, which is the space accommodating an electrical battery pack, and protect the integrity of the vehicle frame. The crash brace 10 provides an additional impact energy path as a secondary rail system within a vehicle body structure, allowing a smaller-sized electrical vehicle to have suitable integrity and safety features. The crash brace 10 can be designed to work with an existing body rear rail system of various vehicle programs upon impact, and those depicted in the illustrations are not meant to be limiting. The crash brace 10 can be designed to absorb and manage rear and/or side impact collision loads so that a portion of an impact energy from the impact load is distributed to the opposite side of the vehicle from the point of impact, thereby improving the rear crash performance and minimizing, controlling, and stabilizing the rear floor assembly structure. This can be particularly advantageous in smaller vehicles with limited space in the rear of the vehicle due to the incorporation of a large structure such as a battery.

A rear bumper is a standard component of the external design of a vehicle. Generally, the bumper 52, as illustrated in FIGS. 2-7, works immediately upon impact to absorb energy from a rear collision. The crash brace 10 operates in conjunction with the bumper 52 to begin (e.g., almost immediately) to absorb and manage energy from a collision. The crash brace 10 further operates in conjunction with a rail system of the vehicle, which is also a standard component of a vehicle design. Generally, the rail system can have body rear rails 54, 56 which help to support and stabilize the vehicle body structure 50 and the surrounding structures and attachments. The crash brace 10 operates to distribute the impact energy from the impact load from the collision to both sides of the body rear rails 54, 56 within the rail system so that the rear-end of the vehicle is balanced and stabilized as the crash brace 10 directs forces and dissipates energy around the battery 40 (see, e.g., FIGS. 4-7).

The crash brace 10 is particularly advantageous and useful in applications within programs demanding short crushable length, such as in vehicles involving any sensitive systems packaged in a rear of a vehicle. The crash brace 10 is especially effective in the application of battery equipped vehicles having batteries installed in the rear of the vehicle or trunk area. For example, the crash brace 10 may be particularly useful in a Battery Electric Vehicle (BEV) having Li-Ion battery modules installed in a rear of the vehicle. It is contemplated that the crash brace 10 may be advantageous in other applications, for example, by a foreign OEM whose car may not meet the Federal Motor Vehicle Safety Standards for hybrid gas/electric vehicles (FMVSS 301) for the US market, whereby the crash brace or variation thereof can be added to the existing rear body structure to enhance the energy management and to potentially meet the FMVSS 301 or FMVSS 305 (battery only vehicles) or FMVSS 303 (hybrid and natural gas vehicles) for Compressed Natural Gas structures in those programs to protect their energy storage systems.

The crash brace 10 and its individual components can be stamped or otherwise formed from one or more materials that are sturdy and can withstand an impact load, including, but not limited to, steel, aluminum, or polymers. For example, the crash brace 10 may be made almost entirely of high strength steel such as, for example, dual phase (DP) steel with class 600 (DP600), class 780 (DP780), or class 980 (DP980). The materials chosen to make the crash brace 10 may vary between programs based on such factors as energy absorption and management goals, weight concerns, and pricing and availability of materials. It is contemplated that other methods of forming the crash brace 10 and its individual components can be used such as die casting, molding or other known processes.

The crash brace 10 can be designed to be adaptive to several different vehicles (or programs) based on many different characteristics of the vehicle, the vehicle body structure 50 and energy absorption and management goals. The characteristics that can be used to tune the crash brace 10 for a given vehicle can include, among other things, the size and cross-sectional shape of the crash brace 10, the presence of any features such as triggers, the material from which the crash brace is made, and the location and placement of the crash brace within the body structure of the vehicle. Proper design of a crash brace for a given program preferably takes into account certain factors related to energy absorption and management such as, for example, the structural integrity of the vehicle body structure during and after a rear or side impact collision, and the protection of the surrounding structures such as, for example, an electrical battery. Often times, such designing is referred to as tuning. As used herein, the terms "tuned," "tuning," "tune," and variations thereof, refer to the adjusting characteristics (e.g., size, strength, and crush patterns) of the crash brace for a body structure in a given vehicle program, based on a variety of structural configurations, design specifications, and a variety of impact scenarios. Typically, tuning of the crash brace 10 is done in conjunction with tuning of the vehicle's structure after the crash brace is attached to the vehicle structure. Often times, tuning can include using Computer Aided Engineering (CAE) simulation tools to ensure accuracy during the designing of the structures. It is contemplated that other forms of tuning may be employed depending on the vehicle structures involved and this description is not meant to be limiting.

FIG. 1 is a top perspective view of an exemplary embodiment of the crash brace 10. In FIG. 1, the crash brace 10 includes two arches, a rear arch 12 and a front arch 14, that are connected by two longitudinal structures 20, 22, which define a first space $Z_1$ between the rear arch 12 and the front arch 14, which may be suitable as, for example, a storage space or a trunk space, such as that depicted in FIG. 4 (a bottom perspective view of an another exemplary embodiment of the crash brace 10). A large vehicle component such as a battery 40 (see FIG. 4) may be situated within a second space $Z_2$ partially defined by the front arch 14 and partially defined by a portion of the vehicle body structure 50 adjacent to the front arch 14. The size and amount of the portion of the vehicle body structure 50 that partially defines the second space $Z_2$ may vary between vehicles, and the depiction of the second space defined in part by the portion of the vehicle body structure 50 and the front arch 14 in the figures herein is not meant to be limiting. For example, the second space $Z_2$ may be further defined in part by the body rear rails 54, 56 where the body rear rails 54, 56 may shape and define the sides of the second space between the vehicle body structure 50 and front arch 14. The second space $Z_2$ may have a defined cross-sectional shape and volume that may vary between vehicle programs with different configurations of body rear rails, including the connections the body rear rails may make with the front arch 14 of the crash brace 10 and the vehicle body structure 50. Additional structures may further limit and/or define the second space $Z_2$ in conjunction with the front arch 14 that are not listed here but are well known in the art. The second space $Z_2$ may have a defined cross-sectional shape and volume that can be adapted to suitably receive and accommodate a large vehicle component such as the battery 40. The crash brace 10 and its individual components may be made of substantially one piece of sturdy material such as steel, aluminum, or polymers, for example high strength steel, and formed into a tube or substantially hollow structure defined by walls having a cross sectional shape of, for example, a square or a rectangle. One skilled in the art will appreciate that the cross-sectional shape of the crash brace components can vary, and can be selected during tuning of the crash brace 10 to achieve desired crash brace characteristics for a given available space in the vehicle.

Figure 4:
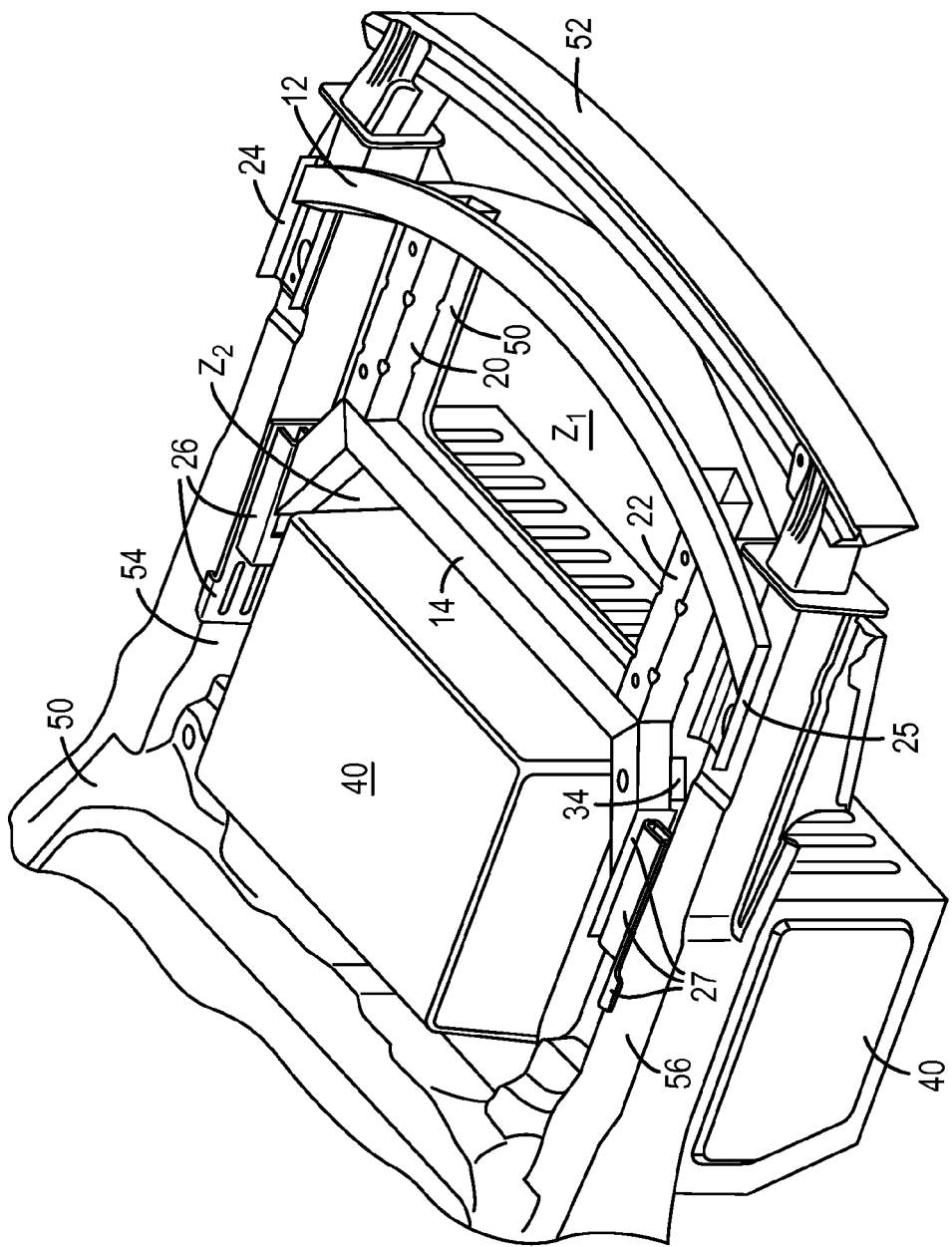
FIG. 4 is a bottom perspective view of the exemplary embodiment of a crash brace of an automotive vehicle including an energy absorbing device made in accordance with the present teachings disposed within a body structure of an automotive vehicle including an automotive battery.
Figure 5:
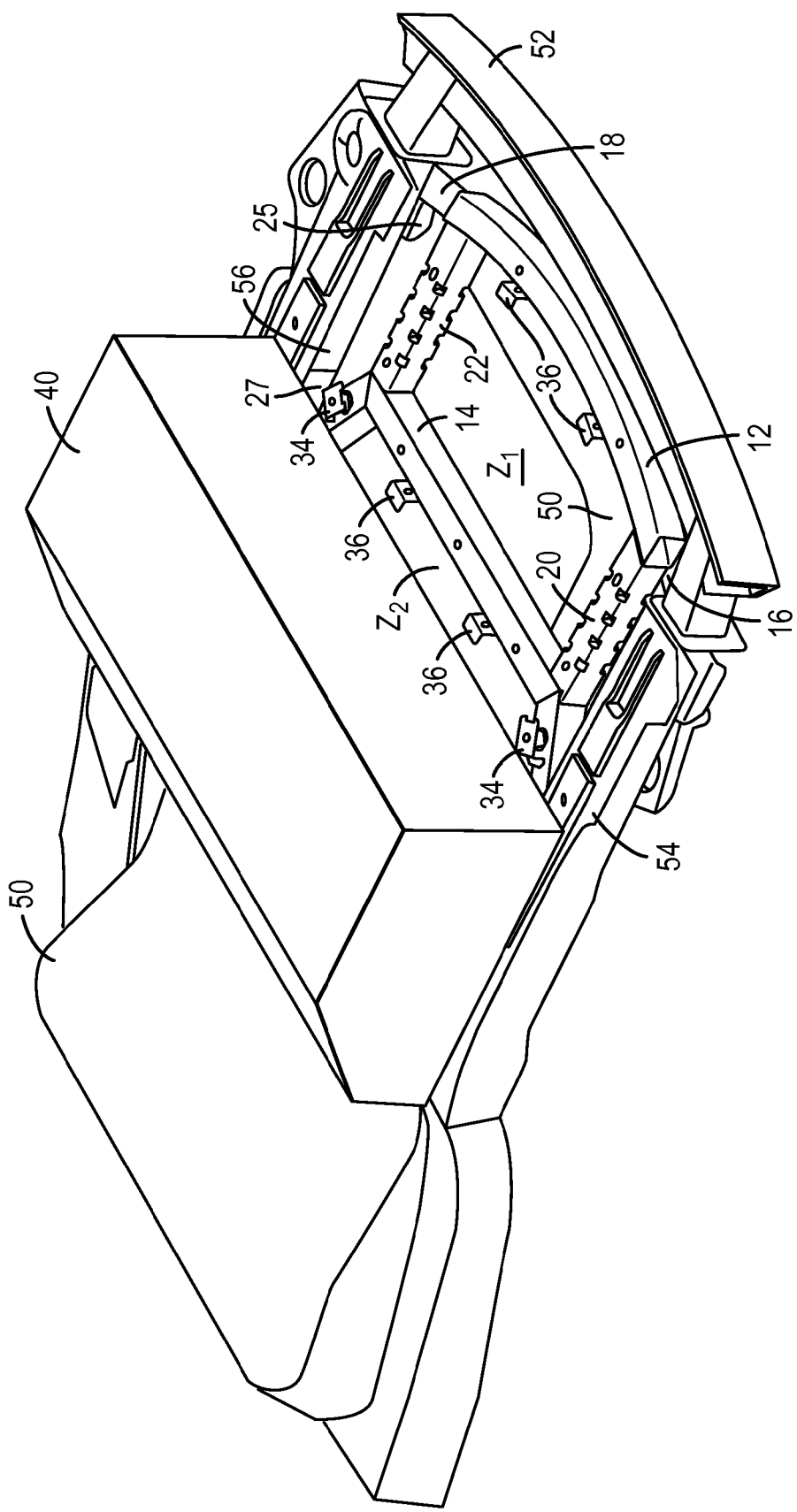
FIG. 5 is a top perspective view of the exemplary embodiment of a crash brace of FIG. 1 disposed within a body structure of an automotive vehicle including an automotive battery.
Figure 6:
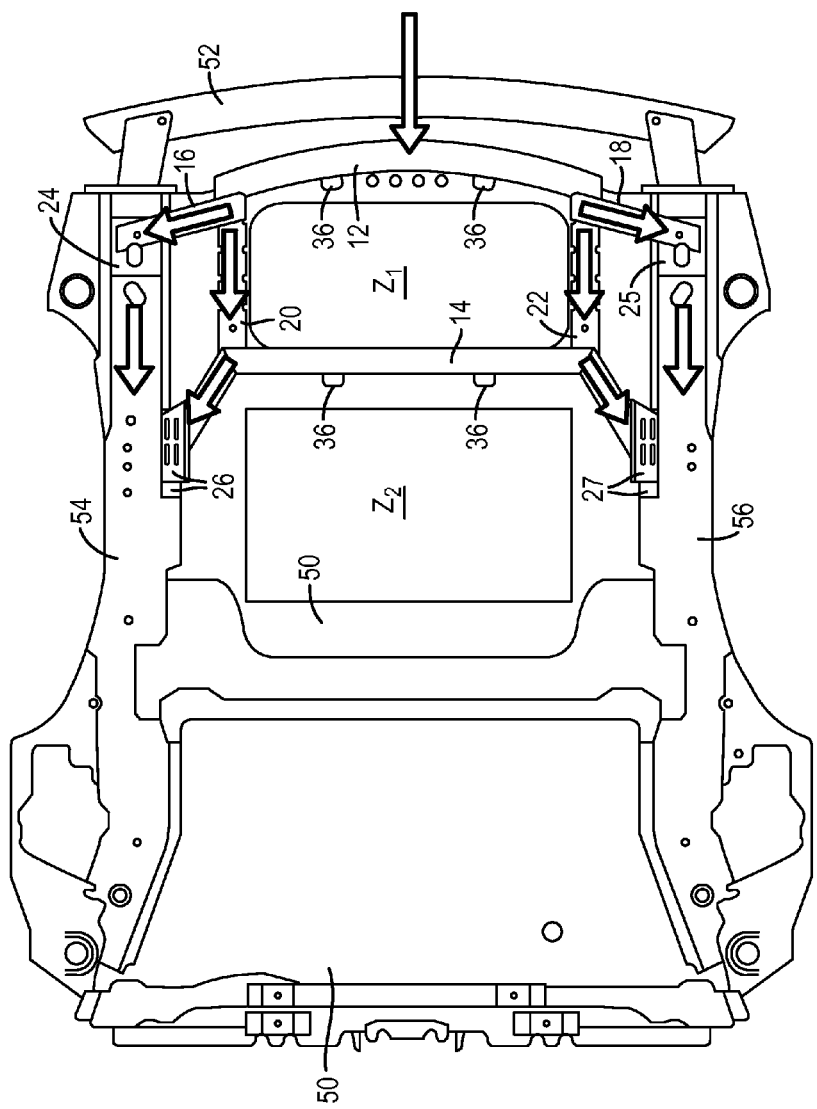
FIG. 6 is a bottom view of a crash brace showing potential energy paths during a rear-end collision.
Figure 7:
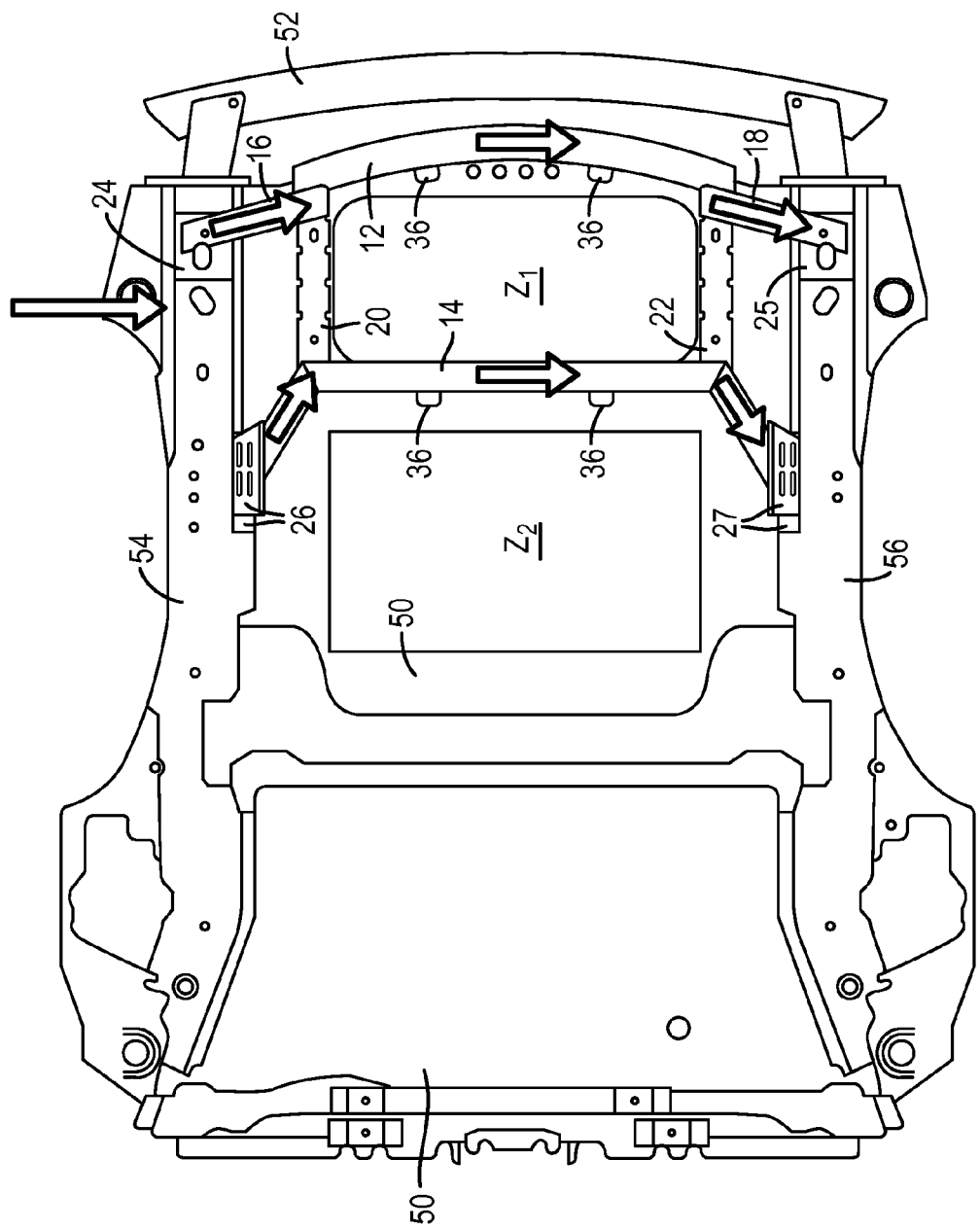
FIG. 7 is a bottom view of a crash brace showing potential energy paths during a side collision at a rear end of a vehicle.

In one exemplary embodiment, the rear arch 12 may be formed substantially from one piece of sturdy material and can withstand the impact of a crash, absorb and control impact energy and protect surrounding structures, such as the battery 40 (e.g., see FIG. 4). The rear arch 12 may be formed into a square-shaped tubular structure comprising substantially a sturdy material, such as steel, aluminum, or polymers, for example, a high strength steel, including DP 600, DP780, or DP980. The rear arch 12 is designed and constructed to cooperate with the vehicle's body rails to absorb the initial impact after the bumper 52 has reached maximum load impact, which may occur almost instantly during the collision. As such, the tubular structure of the rear arch 12 is configured to deform and be crushed upon impact. In one exemplary embodiment, the rear arch 12 can be square-shaped with a cross-sectional area of about 44.4 mm×44.4 mm, or about 50.8 mm×50.8 mm, or about 57.1 mm×57.1 mm, or about 63.5 mm×63.5 mm, and areas therebetween.

In certain exemplary embodiments the rear arch 12 may also be formed into a rectangular-shaped, tubular arch having a cross-sectional area of about 63.5 mm×38.1, about 57.1 mm×31.7 mm, about 50.8 mm×24.4 mm, about 44.4 mm×19.0 mm, and areas therebetween.

The cross-sectional area of the rear arch 12 can be tuned depending on the energy absorption and management goals of the program into which it will be incorporated, including, for example, protecting the surrounding structures such as the electrical battery partially enclosed by the crash brace 10. Thus, the cross-sectional area of the rear arch 12 can be configured to withstand the impact load from a rear or side impact, while still being able to absorb the energy and protect the battery 40 from any impact during a collision.

In certain embodiments of the present teachings, the walls of the tubular structure of the rear arch 12 may have a substantially uniform thickness of about 1.5 mm to about 2.5 mm, or about 1.7 mm to about 2.2 mm, or more preferably about 1.9 mm to about 2.0 mm, or any thickness therebetween, including but not limited to, about 1.7 mm, about 1.9 mm, or about 2.1. The thickness of the walls of the rear arch 12 may be tuned to varying thicknesses depending on the energy absorption and management goals of the crash brace 10 and between vehicle programs. The present teachings also contemplate the walls of the rear arch 12 having a non-uniform thickness, for example to control the crush and crumple behavior of the crash brace 10.

The curvature of the rear arch 12 may be selected or tuned depending on the energy absorption and management goals of the crash brace 10 and, in particular, to be able to withstand the impact of a rear collision or a side collision and absorb and manage the energy from the impact to protect the surrounding structures, such as a battery 40 and the integrity of the vehicle body structure. The curvature of the rear arch 12 may be adapted to fit within different vehicles so that the curvature of the rear arch will vary according to the width of a given vehicle. Thus, the curvature arch angle may range from about 180° to about 360°, including any angle range therebetween. It is contemplated that the rear arch 12 may optionally have an angular arch, such that the arch resembles a more octagonal-shaped arch, and may be composed of jointed segments that are welded and fastened together to form the rear arch 12, as depicted by the front arch of FIG. 1. The shape and angle of the arch may vary between vehicle programs and those depicted in the accompanying figures are not meant to be limiting.

In certain embodiments of the present teachings intended to accommodate pre-defined vehicle programs, the rear arch 12 may have a total length $L_1$, measured from one end that is substantially adjacent to the side of the rear rail system to a second end that is substantially adjacent to the side of the rear rail system, of, for example, about 450 mm to about 1100 mm, or about 500 mm to about 1100 mm, or about 550 to about 1050 mm, or about 600 mm to about 950 mm or any length therebetween, including, but not limited to, about 561 mm, or about 568 mm, or about 766, or about 867, or about 924 mm, or about 1030 mm. It is contemplated that the total length $L_1$ of the rear arch 12 may be tuned to adapt to different vehicle programs depending on the make and model of the vehicle, cost and material considerations, as well as the energy absorption and management goals for the vehicle.

Figure 2:
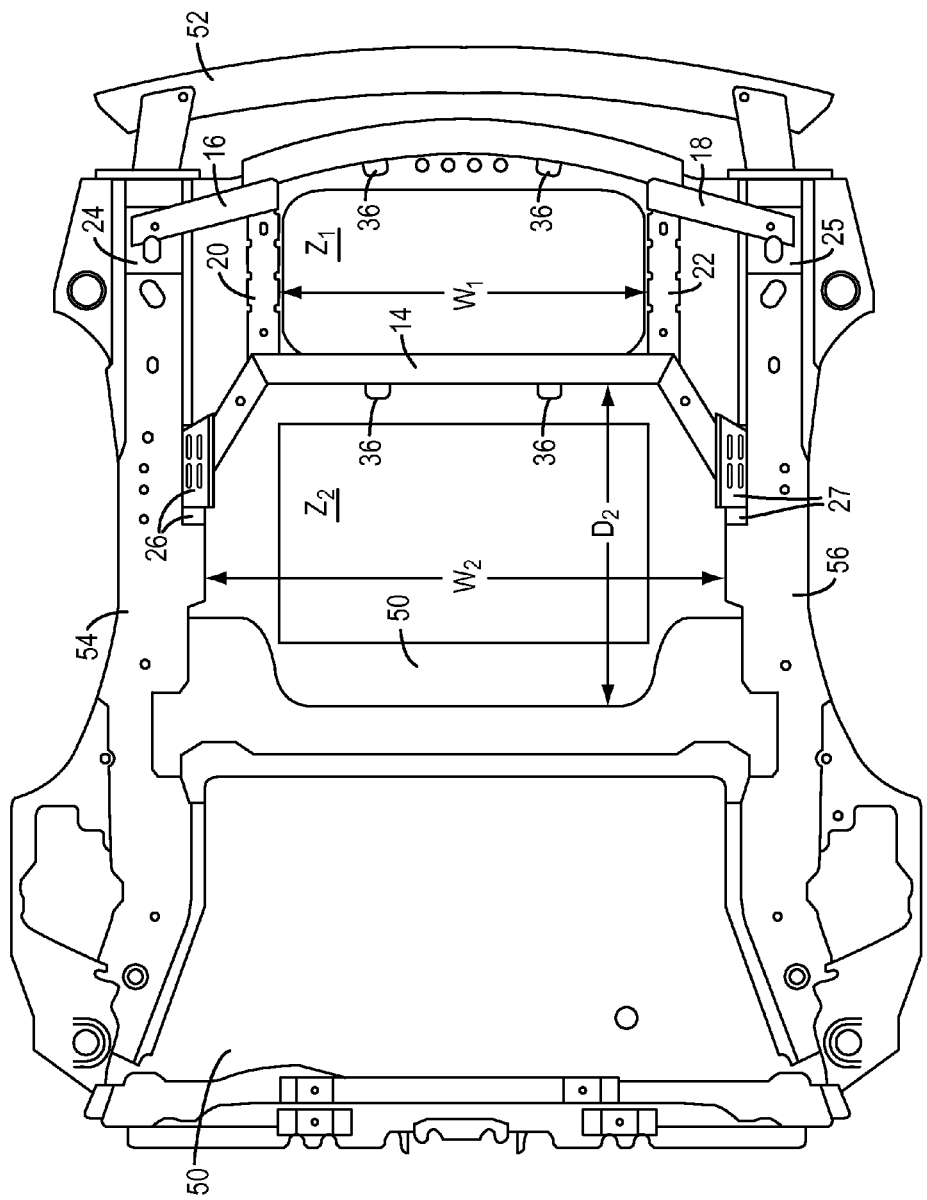
FIG. 2 is a bottom perspective view of the exemplary embodiment of a crash brace of FIG. 1 disposed within a body structure of an automotive vehicle.

In certain exemplary embodiments, the rear arch 12 may be integrally attached, so as to form a single unit, to a set of tubular brackets 16, 18 at each end of the rear arch 12. In particular, the tubular brackets 16, 18 attach to the rear arch 12 at first ends of the tubular brackets 16, 18. In certain exemplary embodiments, it is contemplated that the tubular brackets 16, 18 may also attach, at second ends of the tubular brackets 16, 18, which are opposite the first ends of the tubular brackets 16, 18, to a portion of the longitudinal structures 20, 22 or to both the rear arch 12 and the longitudinal structures 20, 22, as depicted in FIGS. 1 and 2. Such attachment can utilize, for example, welding alone or in combination with known fasteners. The tubular brackets 16, 18 may be welded or otherwise attached or mounted to the ends of the rear arch 12 and may act as extensions of the rear arch 12, in continuing to dissipate the energy from the impact. In the exemplary embodiments that include the tubular brackets 16, 18 at the end of the rear arch 12, the total length $L_1$ of the rear arch 12 remains substantially the same in that the length $L_1$ is not increased greatly due to the addition of the tubular brackets 16, 18. For example, a shorter length rear arch 12 may be used when the tubular brackets 24, 25 are incorporated into the crash brace 10. The tubular brackets 24, 25 may have a total length measured from end to end of about 375 mm to about 500 mm, or about 400 mm to about 475 mm, or about 450 mm to about 465 mm, or any length therebetween, including, but not limited to, about 458 mm, or about 462 mm, or about 466 mm, or any length therebetween. It is contemplated that the total length of the tubular brackets 24, 25 may be tuned to adapt to different vehicle programs depending on the make and model of the vehicle, cost and material considerations, as well as the energy absorption and management goals for the vehicle.

It is contemplated that the rear arch 12 may include additional components such as mounting brackets to augment the functional structure and support of the rear arch 12 as it is incorporated into the vehicle body structure 50. For example, a set of rear mounting brackets 24, 25 can be integrally attached, so as to form a single unit with the rear arch 12, to each of the ends of the rear arch 12 and can be adapted to attach to the vehicle frame 50, and in particular, to further facilitate attachment of the rear arch 12 to the body rear rails 54, 56. The rear mounting brackets 24, 25 may be welded to the rear arch or attached using known fasteners f, or a combination thereof. In certain embodiments where the tubular brackets 16, 18 are present, the rear mounting brackets 24, 25 may be welded to the tubular brackets 16, 18 at an end opposite the attachment of the tubular brackets 16, 18 to the rear arch 12 or attached using known fasteners f, or a combination thereof. The rear mounting brackets 24, 25 themselves may be welded to the bottom of the body rear rails 54, 56, further stabilizing the crash brace 10 within the vehicle body structure 50. The rear mounting brackets 24, may have one or more apertures, such as those depicted in FIG. 1, to facilitate the attachment of the rear mounting brackets 24, 25, and thereby the rear arch 12, and/or the tubular brackets 16, 18, to the vehicle body structure 50, and more specifically to the bottom of the body rear rails 54, 56, using welding alone or in combination with known fasteners f. As used herein, the terms "fasteners," "fastening mechanisms," or variants thereof, refer to any known fasteners in the art including, but not limited to adhesives, pins, screws, M8 or M12 bolts, bolts, clips, and brackets.

In certain embodiments, the rear mounting brackets 24, 25 can have a substantially uniform thickness of about 1.5 mm to about 3.5 mm, or about 2.0 mm to about 3.2 mm, or more preferably about 2.5 mm to about 3.0 mm, or any thickness therebetween, including but not limited to, about 2.5 mm, about 3.0 mm, or about 3.5 mm. The thickness of the rear mounting brackets 24, 25 may be tuned to varying thicknesses depending on the attachment method, the weight of the crash brace 10, the energy absorption and management goals of the crash brace 10 and between vehicle programs.

The placement, size, and shape of the rear mounting brackets 24, 25 can vary depending on a configuration of the body rear rails 54, 56 to which they attach. Thus, it is contemplated that the placement, size, and shape of the rear mounting brackets 24, 25 can be tuned between programs and depending on vehicle configuration as well as energy absorption and management goals. The rear mounting brackets 24, 25 can be made of the same material as the rear arch 12 or another sturdy material that can withstand the impact load from a rear or side collision, such as steel, aluminum, or polymers, for example high strength steel with grade 350 (HSLA350).

The front arch 14 may be formed into a square-shaped tubular structure comprising substantially the same sturdy material as the rear arch 12, such as steel, aluminum, or polymers, for example, a high strength steel, including DP 600, DP780, or DP980. The front arch 14 is designed and constructed to reinforce a rear end of the vehicle and dissipate the energy and load (caused by a side impact or a rear impact) to the rear rails 54, 56, because the front arch 14 absorbs the energy from the impact load transferred from the longitudinal structures 20, 22. The front arch 14 is configured to protect the battery 40, which is positioned within the second space $Z_2$ partially defined by the front arch 14, so that there is zero impact of the crash brace or the vehicle frame with the battery 40 during or after the collision. The second space $Z_2$ is further defined by a portion of the vehicle body structure 50, as well as the body rear rails 54, 56. As such, the front arch 14 may be configured to have a cross-sectional area of about 44 mm×44 mm, or about 51 mm×51 mm, or about 57 mm×57 mm, or about 64 mm×64 mm, and areas therebetween.

In certain exemplary embodiments, the front arch 14 may also be formed into a rectangular-shaped, tubular arch with a cross-sectional area of about 63.5 mm×38.1, about 57.1 mm×31.7 mm, about 50.8 mm×24.4 mm, about 44.4 mm×19.0 mm, and areas therebetween.

The cross-sectional area of the front arch 14 can be tuned depending on the energy absorption and management goals of the program into which it will be incorporated, including, for example, providing a short overall rear-end overhang while protecting the surrounding structures such as the battery 40 partially enclosed by the front arch 14 of the crash brace 10, and further defined and enclosed by the body rear rails 54, 56 in part and a portion of the vehicle body structure 50. Thus, the cross-sectional area and overall strength of the front arch 14 can be configured to withstand the impact load from a rear or side impact, while still being able to absorb the energy and protect the battery 40 from impact during a collision.

The walls of the tubular structure of the front arch 14 may have a substantially uniform thickness of about 1.5 mm to about 2.5 mm, or about 1.7 mm to about 2.2 mm, or more preferably about 1.9 mm to about 2.0 mm, and any thickness therebetween, including but not limited to, about 2.5 mm, about 3.0 mm or about 3.5 mm. The thickness of the walls of the front arch 14 may be tuned to varying thicknesses depending on the energy absorption and management goals of the crash brace 10 and between vehicle programs. Those skilled in the art will understand that the wall thickness need not be uniform.

The curvature of the front arch 14 also may be tuned depending on the energy absorption and management goals of the crash brace 10, and in particular, to be able to withstand the impact of a rear or side collision and absorb and manage the energy from the impact in order to protect the surrounding structures, such as the battery 40, and the integrity of the vehicle body structure. The curvature of the front arch 14 may be adapted to fit within different vehicles so that the curvature of the front arch will vary according to the width of a given vehicle. Thus, the curvature or arch angle may range from about 180° to about 360°, including any angle range therebetween. It is contemplated that the front arch 14 may optionally have an angular arch, such that the curved portion of the arch is more octagonal-shaped, and may comprise jointed segments that are welded and/or fastened together to form the total front arch 14, as depicted in the present illustrations. The shape and angle of the arch may vary between vehicle programs and those depicted herein are not meant to be limiting.

The front arch 14 may have a total length $L_2$ measured from end to end of, for example, about 450 mm to about 1100 mm, or about 500 mm to about 1100 mm, or about 550 mm to about 1050 mm, or about 600 mm to about 950 mm or any length therebetween, including, but not limited to, about 561 mm, or about 568 mm, or about 766 mm, or about 867 mm, or about 924 mm, or about 1030 mm. It is contemplated that the total length $L_2$ of the front arch 14 may be tuned to adapt to different vehicle programs depending on the make and model of the vehicle, cost and material considerations, as well as the energy absorption and management goals for the vehicle.

It is contemplated that the front arch 14 may include additional components such as mounting brackets to augment the functional structure and support of the front arch 14 as it is incorporated into the vehicle body structure 50. For example, a front bracket assembly 26, 27 can be integrally attached to each of the ends of the front arch 14 and can be adapted to attach to the vehicle frame 50, and in particular, to further facilitate attachment of the front arch 14 to the surrounding vehicle body structure 50. The front bracket assembly may include two or more additional bracket components, such as those depicted in FIGS. 1 and 2, that further facilitate the attachment and securing of the front arch 14 to the vehicle body structure 50, and in particular, to the inner sides of the body rear rails 54, 56. The components of the front bracket assembly 26, 27 may be secured to each other using welding alone or in combination with known fasteners. The front bracket assembly 26, 27 may be welded to the front arch 14 or attached using known fasteners, or a combination thereof.

Each front bracket assembly 26, 27 may have one or more apertures, such as those depicted in FIG. 1, to facilitate attachment to the front arch 14 and to the inner sides of the body rear rails 54, 56. The size and shape of the front bracket assembly 26, 27 can vary depending on the positional relationship of the front bracket assembly 26, 27 with each of the front arch 14 and the vehicle body structure 50. Thus, it is contemplated that the size and shape of the front bracket assembly 26, 27 can be tuned between programs and depending on energy absorption and management goals. The front bracket assembly 26, 27 can be made of the same material as the front arch 14 or another sturdy material that can withstand the impact load from a rear or side collision, such as, for example, HSLA350.

The front bracket assembly 26, 27 and its individual bracket components can have a substantially uniform thickness of between about 1.5 mm to about 3.5 mm, or between about 2.0 mm to about 3.2 mm, or more preferably between about 2.5 mm to about 3.0 mm, or any thickness therebetween, including but not limited to, about 2.5 mm, about 2.7 mm, or about 3.0 mm. The thickness of the front bracket assembly 26, 27 may be tuned to varying thicknesses depending on the energy absorption and management goals of the crash brace 10 and between vehicle programs.

Figure 3:
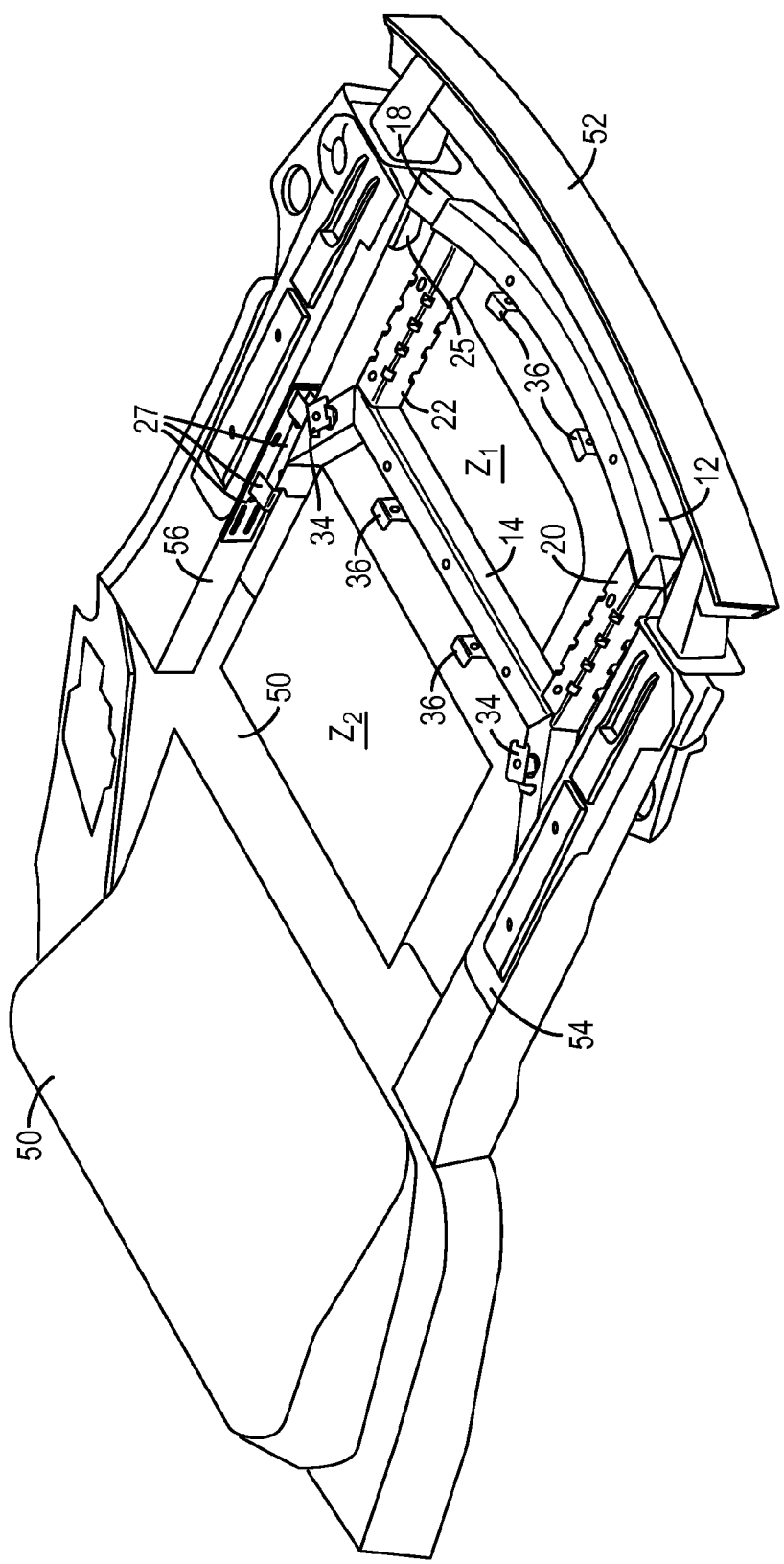
FIG. 3 is a top perspective view of the exemplary embodiment of a crash brace of FIG. 1 disposed within a body structure of an automotive vehicle.

In certain embodiments of the present teachings, one or more attachment braces 34 may be disposed about the front arch 14 and can be adapted to facilitate the attachment of the crash brace 10 to the vehicle body structure 50, as depicted in FIGS. 2 and 3. The one or more attachment braces 34 may be, for example, paired with known fasteners, such as M12 bolts, and/or welded to both the front arch 14 and the vehicle body structure 50 to further facilitate the attachment and stabilization of the front arch 14 to the vehicle body structure 50.

The placement, size, and shape of the attachment braces 34, as well as the material from which they are made, can vary depending on a configuration of the front arch 14 to which they attach. Thus, it is contemplated that the placement, size, and shape of the attachment braces 34 can be tuned between programs and depending on vehicle configuration as well as energy absorption and management goals. The attachment brace 34 may be made of steel, aluminum, or polymers, for example a high-strength steel such as HSLA350. The attachment brace 34 may be in the form of an H-brace or a metal plate, and may be used together with an M12 bolt as it is welded to the front arch 14 and the vehicle body structure 50.

In various embodiments of the present teachings, one or more floor pan tabs 36 may be disposed about both the rear arch 12 and the front arch 14 to facilitate the attachment of the crash brace 10 to the vehicle body structure 50. The floor pan tabs 36 may be welded to the front arch 14 and the rear arch 12, as well as to the vehicle body structure 50, to further facilitate the attachment and stabilization of the crash brace 10 to the vehicle body structure 50. It is contemplated that known fasteners may also be used in conjunction with the floor pan tabs 36 in securing the crash brace 10 to the vehicle body structure 50.

The placement, size, and shape of the floor pan tabs 36 can vary depending on a configuration of the crash brace 10 and floor assembly 50 to which they attach. Thus, it is contemplated that the placement, size, and shape of the floor pan tabs 36 can be tuned between programs and depending on vehicle configuration as well as energy absorption and management goals. The floor pan tabs 36 may be made of steel, aluminum, or polymers, for example a high-strength steel such as HSLA350 and may be welded to the crash brace 10 and the vehicle body structure 50. The floor pan tabs 36 may have a thickness of about 1.5 mm, although it is contemplated that other known attachment brackets may be used alone or in combination with the floor pan tabs 36 for attachment and stabilization of the crash brace 10.

The longitudinal structures 20, 22 integrally connect, to form a single unit, the rear arch 12 and the front arch 14. The rear arch 12 and the front arch 14 each may be welded or otherwise attached to the longitudinal structures 20, 22 prior to placement into the vehicle. Indeed, in certain embodiments, the crash brace 10 is assembled prior to attachment to the vehicle frame 50. It is contemplated that the longitudinal structures 20, 22 may be secured to the rear arch 12 and the front arch 14 using welding alone or in combination with known fastening mechanisms. The longitudinal structures 20, 22 form a bridge between the rear arch 12 and the front arch 14, the length of which can be tuned between vehicles. For example, the length of the longitudinal structures 20, 22 may be selected based on the desired and/or required area within which to situate a battery and/or provide a storage space, and on other design constraints of the vehicle program (e.g., rear-end styling) and the energy absorption and management goals for that vehicle.

In certain embodiments, the length of the longitudinal structures 20, 22 may be about 225 mm to about 350 mm, or about 235 mm to about 325 mm, or about 245 mm to about 300 mm, or any length therebetween, including but not limited to, about 220 mm, or about 230 mm, or about 245 mm, or about 250 mm. It is contemplated that the length of the longitudinal structures 20, 22 may be tuned to adapt to different vehicle programs depending on the make and model of the vehicle, cost and material considerations, as well as the energy absorption and management goals for the vehicle.

Within the crash brace 10, the location and placement of the longitudinal structures 20, 22 relative to the rear arch 12 and the front arch 14 can be tuned for a specified vehicle program and to meet predetermined energy absorption and management goals. For example, the first space $Z_1$ defined by the longitudinal structures 20, 22, the rear arch 12, and the front arch 14 may define a width $W_1$ between the two longitudinal structures 20, 22 of, for example, about 450 mm to about 650 mm, or about 500 mm to about 600 mm, or about 550 mm to about 575 mm, or any width therebetween, including, but not limited to, about 561 mm, or about 568 mm, or about 576 mm. The first space $Z_1$ defined by the longitudinal structures 20, 22, the rear arch 12 and the front arch 14 may have a depth $D_1$ between the rear arch 12 and the front arch 14 of, for example, about 250 mm to about 450 mm, or about 275 mm to about 425 mm, or about 300 mm to about 375 mm, or any depth therebetween, including, but not limited to, about 304 mm, or about 312 mm, or about 330 mm. It is contemplated that the first space $Z_1$ defined by the longitudinal structures 20, 22, the rear arch 12 and the front arch 14 may be tuned based on requirements for a specified vehicle program, cost and material considerations, as well as the energy absorption and management goals for the vehicle.

The second space $Z_2$ partially defined by the front arch 14, the body rear rails 54, 56 in part, and a portion of the vehicle body structure 50, may have a width $W_2$ between the body rear rails 54, 56 of about 600 mm to about 1000 mm, or about 650 mm to about 950 mm, or about 700 mm to about 900 mm, or any width therebetween, including, but not limited to, about 728 mm, or about 766 mm, or about 867 mm. The second space $Z_2$ may have a depth $D_2$ between the front arch 14 and the portion of the vehicle body structure 50 of, for example, about 300 mm to about 475 mm, or about 325 mm to about 450 mm, or about 350 mm to about 425 mm, or any depth therebetween, including, but not limited to, about 330 mm, or about 375 mm, or about 412 mm. It is contemplated that the second space $Z_2$ partially defined by the front arch 14, the body rear rails 54, 56 in part and a portion of the vehicle body structure 50 may be tuned to adapt to different vehicle programs depending on the size of a large vehicle component, such as a battery, to be situated in the second space $Z_2$, the make and model of the vehicle, cost and material considerations, as well as the energy absorption and management goals for the vehicle.

The longitudinal structures 20, 22 each may be formed into a square-shaped tubular structure comprising substantially the same sturdy material, such as steel, aluminum, or polymers, for example high strength steel, including DP780. The longitudinal structures 20, 22 are configured to cooperate with the body rails 54, 56 upon at least a rear impact and collapse axially along the length of each longitudinal structure 20, 22 and in parallel with the body rear rails 54, 56 to facilitate the absorption and management of the impact collision energy. For example, the longitudinal structures 20, 22 are configured to collapse in response to an impact energy from an impact load being absorbed and transferred from the rear arch 12, so that the rear arch 12 shifts toward the front arch 14 at a speed and distance dependent upon the impact load of the collision. The longitudinal structures 20, 22 may be formed into a square-shaped tubular structure with a cross-sectional area of about 44.4 mm×44.4 mm, or about 50.8 mm×50.8 mm, or about 57.1 mm×57.1 mm, or about 63.5 mm×63.5 mm, and areas therebetween. It is contemplated that the longitudinal structures 20, 22 may alternatively be formed into a rectangular-shaped, tubular arch with a cross-sectional area of about 63.5 mm×38.1 mm, about 57.1 mm×31.7 mm, about 50.8 mm×24.4 mm, about 44.4 mm×19.0 mm, and areas therebetween.

The cross-sectional area of the longitudinal structures 20, 22 can be tuned depending on the energy absorption and management goals of the program into which it will be incorporated, including, for example, protecting the surrounding structures such as the battery partially enclosed by the crash brace 10. Thus, the cross-sectional area of the longitudinal structures 20, 22 can be configured to stabilize and support the crash brace 10 under normal conditions as well as to facilitate collapse during impact of a collision.

The walls of the tubular structure of the longitudinal structures 20, 22 may have a substantially uniform thickness of about 1.25 mm to about 2.5 mm, or about 1.5 mm to about 2.2 mm, or more preferably about 1.7 mm to about 2.0 mm, or any thickness therebetween, including but not limited to, about 1.3 mm, or about 1.5 mm, or about 1.7 mm, or about 1.9 mm. The thickness of the walls of the longitudinal structures 20, 22 may be tuned to varying thicknesses depending on the energy absorption and management goals of the crash brace 10 and between vehicle programs. One skilled in the art will appreciate that the walls of the tubular structure of the longitudinal structures 20, 22 need not have a uniform thickness.

In certain embodiments of the present teachings, the longitudinal structures 20, 22 may have a plurality of notches or triggers 21 disposed about the edges of each longitudinal structure 20, 22, such as those depicted in FIG. 1. The plurality of triggers 21 (e.g., see FIG. 1) are configured to assist in the energy absorption and management during impact and to help facilitate the deformation of the longitudinal structures 20, 22 in the event of a rear or side impact collision. The longitudinal structures may be tuned to a desired energy absorbing strength and a favorable deformation mode based on requirements for a particular vehicle program. Each vehicle system depending on its weight, shape and the crashworthiness of its body structure has a different energy absorbing strength as well as different crash deformation modes. The energy absorbing strength and crash deformation modes vary from one vehicle to another. The crash brace 10 can be tuned to work in parallel with an existing vehicle structure, such as the vehicle body structure 50, in order to optimize the existing strengths, crashworthiness and the deformation modes of the vehicle.

In operation, the crash brace 10 can be configured to cooperate with the vehicle body rails to absorb and manage impact energy from a rear or side collision and stabilize the package zone in and around the battery. In a scenario where there is, for example, a rear impact at 55 mph having a left-side or right-side 70% offset, the bumper 52 takes on the initial load of the impact and then the rear arch 12 absorbs the impact energy and transfers the impact energy to the longitudinal structures 20, 22, as well as dissipates the impact energy to the body rear rails 54, 56. In embodiments where the tubular brackets 16, 18 are incorporated into the crash brace 10, the rear arch 12 transfers the impact energy from the impact load to the body rear rails 54, 56 through the tubular brackets 16, 18. Thus, the impact energy is transferred from the rear arch 12 to the rail system of the vehicle body structure 50, as depicted by the arrows in FIG. 6, thereby protecting the battery 40 positioned within the second space $Z_2$ partially defined by the front arch 14. As the longitudinal structures 20, 22 collapse axially and in parallel with the body rear rails 54, 56, the front arch 14 maintains structural integrity by transferring the impact energy from the longitudinal structures 20, 22 to the body rear rails 54, 56, preventing the impact load from affecting the second space $Z_2$ within which the battery 40 is situated. The crash brace 10 can have a closed loop design, which facilitates maximum structural stability as it is configured to dissipate the impact energy to and from several different directions. In this way, the battery 40 can experience zero impact from the collision. The term "closed-loop" as used herein can include the path through which impact energy follows during the collision as the energy is dissipated through the crash brace, starting at the point of impact and travelling along the crash brace to an opposite side, eventually ending on the non-impact side.

In a scenario where there is, for example, a side impact at 50 mph from either the left or the right side, and at a location adjacent to a center of the battery, the body rear rail 54 or 56 (depending on the side from which an impact is received) takes on the initial load of the impact and then the rear arch 12 absorbs the impact energy from the impact side, and transfers the impact energy along the path of the rear arch 12 to the opposite non-impact side of the rear arch 12 and toward the opposite body rear rails 54, or 56. In embodiments where the tubular brackets 16, 18 are incorporated into the crash brace 10, the tubular bracket 16 or 18 on the impact side transfers the impact energy from the impact load to the rear arch 12 and then to the opposite tubular bracket 16 or 18 on the non-impact side and to the body rear rail 54 or 56. The body rear rails 54, 56 also transfer the impact energy to the front arch 14 allowing the impact energy to travel the path of the front arch 14 dissipating the energy to the body rear rails 54, 56 of the non-impact side. Thus, the impact energy travels in a closed loop and is transferred from the body rear rails 54, 56 of the impact side to the rear arch 12 and to the body rear rails 54, 56 of the non-impact side, as depicted by the arrows in FIG. 6. Additionally, the impact energy is transferred from the body rear rails 54, 56 of the impact side to the front arch 14 and to the body rear rails 54, 56 of the non-impact side. The battery 40 is thereby protected so that the battery 40 receives zero impact from the side impact collision. The longitudinal structures 20, 22 provide supplemental support to the structure of the crash brace 10 during the side impact collision.

It is contemplated that in alternative configurations of vehicle frame assemblies, a crash brace in accordance with the present teachings may vary in size, shape, position and placement as well as the material from which it is made, in order to supply the most efficient energy absorption and management for the particular vehicle within which it is situated.

While the present teachings have been disclosed in terms of exemplary embodiments in order to facilitate better understanding of the present teachings, it should be appreciated that the present teachings can be embodied in various ways without departing from the principle of the teachings. Therefore, the present teachings should be understood to include all possible embodiments which can be embodied without departing from the principle of the teachings set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present teaching. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A crash brace for use as an energy absorption and management device, the crash brace comprising:
   a rear arch;
   a front arch;
   a set of longitudinal structures with a plurality of triggers, the longitudinal structures connecting the rear arch to the front arch and defining a first space between the front arch, the rear arch and the longitudinal structures, the first space having a defined cross-sectional shape and volume;
   a set of rear mounting brackets attached to each end of the rear arch and adapted to attach to a rear rail of a vehicle body structure; and
   a front bracket assembly attached to each end of the front arch and adapted to attach to a rear rail of the vehicle body structure, a portion of the vehicle body structure and the front arch partially defining a second space, the second space having a defined cross-sectional shape and volume,
   wherein the crash brace is configured to absorb and manage impact energy and prevent the impact from affecting the cross-sectional shape and volume of the second space.

2. The crash brace of claim 1, further comprising one or more attachment braces disposed about the front arch, wherein the attachment braces are adapted to facilitate the attachment of the crash brace to the vehicle body structure.

3. The crash brace of claim 1, wherein the second space is further defined in part by a set of body rear rails, the crash brace configured to cooperate with the body rear rails.

4. The crash brace of claim 1, wherein the rear arch is made of high strength steel.

5. The crash brace of claim 1, wherein the front arch is made of high strength steel.

6. The crash brace of claim 1, wherein the set of longitudinal structures is made of high strength steel.

7. The crash brace of claim 1, wherein a cross section of the rear arch is square-shaped.

8. The crash brace of claim 1, wherein a cross section of the rear arch is rectangular-shaped.

9. The crash brace of claim 1, wherein a cross section of the front arch is square-shaped.

10. The crash brace of claim 1, wherein a cross section of the front arch is rectangular-shaped.

11. The crash brace of claim 1, wherein a cross section of the longitudinal structures is square-shaped.

12. The crash brace of claim 1, wherein a cross section of the longitudinal structures is rectangular-shaped.

13. The crash brace of claim 1, wherein the rear arch is configured to deform and bend upon load impact during a collision.

14. The crash brace of claim 1, wherein the set of longitudinal structures is configured to collapse axially and in parallel with the body rear rails upon impact load transferring impact energy from the rear arch during a collision.

15. The crash brace of claim 1, wherein the front arch is configured to dissipate impact energy to the body rear rails upon impact transferring impact energy from the longitudinal structures, and
   wherein the front arch protects the battery so there is zero impact with the battery during a collision.

16. A method of manufacturing a crash brace for managing rear impact energy in a vehicle, the method comprising:
   attaching a rear arch to a set of longitudinal structures at a first end;
   attaching a set of tubular brackets at first ends to each end of the rear arch;
   attaching the set of tubular brackets at second ends to a set of rear mounting brackets, each rear mounting bracket attaching to a rear rail of a body structure of the vehicle;
   attaching a front arch to the set of longitudinal structures at a second end; and
   attaching a bracket assembly to each end of the front arch, each bracket assembly attaching to a rear rail of the body structure of the vehicle, the crash brace configured to cooperate with the rear rails.

17. The method of claim 16, further comprising attaching one or more attachment braces to the front arch, the attachment braces facilitating attachment to the body structure.

18. The method of claim 16, wherein the front arch is configured to dissipate impact energy to the body rear rails upon impact transferring impact energy from the longitudinal structures, and wherein the front arch protects the battery so there is zero impact with the battery during a collision.

19. A method of dissipating impact energy from an impact load through a crash brace during a rear collision, the method comprising:

transferring impact energy received by a bumper to the crash brace of claim 1;

transferring impact energy from the rear arch of the crash brace to a set of body rear rails of the body structure, the crash brace configured to cooperate with the body rear rails;

transferring impact energy from the rear arch to the longitudinal structures;

transferring impact energy from the longitudinal structures to the front arch; and transferring impact energy from the front arch to the body rear rails, wherein the energy transferred is dissipated from the impact load to the body rear rails preventing impact from affecting the cross-sectional shape and volume of the second space.

20. A method of dissipating impact energy from an impact load through a crash brace during a side collision of a vehicle, the method comprising:

transferring impact energy received by a side of the vehicle having a body rear rail to the crash brace of claim 1;

transferring impact energy from the body rear rail on the side of impact to the rear arch of the crash brace, the crash brace configured to cooperate with the body rear rails;

transferring impact energy from the rear arch to a body rear rail opposite the side of impact;

transferring impact energy from the body rear rail on the side of impact to the front arch; and transferring impact energy from the front arch to the body rear rail opposite the side of impact, wherein the energy transferred is dissipated from the impact load to the body rear rails preventing impact from affecting the cross-sectional shape and volume of the second space.

* * * * *